US012710273B2

(12) United States Patent
Nawaz

(10) Patent No.: US 12,710,273 B2
(45) Date of Patent: Aug. 18, 2026

(54) METHOD FOR OPERATING A SENSOR CIRCUIT IN A MOTOR VEHICLE, A SENSOR CIRCUIT, AND A MOTOR VEHICLE WITH THE SENSOR CIRCUIT

(71) Applicant: CARIAD SE, Wolfsburg (DE)

(72) Inventor: Muhammad Saad Nawaz, Ingolstadt (DE)

(73) Assignee: CARIAD SE, Wolfsburg (DE)

(*) Notice: Subject to any disclaimer, the term of this patent is extended or adjusted under 35 U.S.C. 154(b) by 291 days.

(21) Appl. No.: 18/264,921

(22) PCT Filed: Jan. 28, 2022

(86) PCT No.: PCT/EP2022/052076

§ 371 (c)(1),
(2) Date: Aug. 9, 2023

(87) PCT Pub. No.: WO2022/171460

PCT Pub. Date: Aug. 18, 2022

(65) Prior Publication Data

US 2024/0125604 A1 Apr. 18, 2024

(30) Foreign Application Priority Data

Feb. 10, 2021 (DE) ......................... 102021103134.6

(51) Int. Cl.
*B60W 60/00* (2020.01)
*G01C 21/30* (2006.01)

(52) U.S. Cl.
CPC ........... *G01C 21/30* (2013.01); *B60W 60/001* (2020.02); *B60W 2420/408* (2024.01);
(Continued)

(58) Field of Classification Search
CPC ......... B60W 60/001; B60W 2420/408; B60W 2554/20; B60W 2554/4042;
(Continued)

(56) References Cited

U.S. PATENT DOCUMENTS 6,311,123 B1 * 10/2001 Nakamura ............ G01S 13/931 123/352
10,460,181 B2 10/2019 Mayser
11,107,227 B1 * 8/2021 Gangundi ............ G06V 10/454
11,176,385 B2 11/2021 Kristensen et al.
(Continued)

FOREIGN PATENT DOCUMENTS

DE 102015202099 A1 8/2016
DE 102016212587 A1 1/2018
(Continued)

OTHER PUBLICATIONS

JP 2019109393 A—machine translation (Year: 2019).*
JP 2012089114 A—machine translation (Year: 2012).*

*Primary Examiner* — Dino Kujundzic
(74) *Attorney, Agent, or Firm* — Seed Intellectual Property Law Group LLP

(57) ABSTRACT

The disclosure relates to a method for operating a sensor circuit in a motor vehicle, wherein a processor in the sensor circuit receives a reflection signal from an environment of the motor vehicle by way of an environmental sensor and ascertains from the reflection signal a particular detection point, which describes a relative position of a reflection event with respect to the motor vehicle. The disclosure involves the processor using pattern data to establish a surface region in the environment and a category of the surface region and checking for the detection point whether it lies in the surface region, and the detection point which lies in a surface region is categorized according to the pattern data of the surface region and the detection point is filtered according to its categorization by way of a filtering
(Continued)

action for trajectory planning of a driving trajectory of the motor vehicle.

13 Claims, 6 Drawing Sheets

(52) U.S. Cl.
CPC . *B60W 2554/20* (2020.02); *B60W 2554/4042* (2020.02); *B60W 2555/60* (2020.02); *B60W 2556/40* (2020.02)

(58) Field of Classification Search
CPC .......... B60W 2555/60; B60W 2556/40; G06V 20/58; G01C 21/3863; G01S 13/931
See application file for complete search history.

(56) References Cited

U.S. PATENT DOCUMENTS

| | | | | |
|---|---|---|---|---|
| 12,181,560 | B2 * | 12/2024 | Miyahara | G01S 13/931 |
| 12,371,027 | B2 * | 7/2025 | Vasoya | G08G 1/0112 |
| 2018/0232947 | A1 * | 8/2018 | Nehmadi | G01S 7/295 |
| 2021/0073559 | A1 * | 3/2021 | Pyo | B60W 40/02 |
| 2021/0180987 | A1 | 6/2021 | Terada | |
| 2021/0341293 | A1 | 11/2021 | Schack et al. | |

FOREIGN PATENT DOCUMENTS

| | | | | |
|---|---|---|---|---|
| DE | 102018122374 | A1 | | 3/2020 |
| DE | 102018217840 | A1 | | 4/2020 |
| DE | 102018220782 | A1 | | 6/2020 |
| DE | 102019101405 | A1 | | 7/2020 |
| JP | 2012089114 | A | * | 5/2012 |
| JP | 2019109393 | A | * | 7/2019 |
| JP | 2020038360 | A | | 3/2020 |
| WO | 2020/154366 | A1 | | 7/2020 |

* cited by examiner

METHOD FOR OPERATING A SENSOR CIRCUIT IN A MOTOR VEHICLE, A SENSOR CIRCUIT, AND A MOTOR VEHICLE WITH THE SENSOR CIRCUIT

BACKGROUND

Technical Field

The disclosure relates to a method for operating a sensor circuit in a motor vehicle. A processor unit in the sensor circuit receives a reflection signal from an environment of the motor vehicle by way of at least one environmental sensor and ascertains from this a particular detection point, which describes a relative position of a reflection event with respect to the motor vehicle. One example of such a sensor circuit is a radar environmental sensor. The disclosure relates to a corresponding sensor circuit and a motor vehicle having such a sensor circuit.

Description of the Related Art

For automated driving functions, such as a cruise control or Autobahn pilots, one challenging scenario is the recognition of the end of a traffic jam from a safe distance (over 200 m). Due to the limited range of the front camera sensor and the LIDAR sensor, only the radar sensor remains as the principal data source for the recognition of the end of a traffic jam at such great distance.

Since the temporarily stationary objects (vehicles) at the end of a traffic jam have the same speed as the highway infrastructure (that is, landmarks such as crash barriers, tunnel entrances, sign gantries), one of the strong points of radar, namely, to distinguish radar reflections in the Doppler range (based on the speed of movement of the other vehicles) makes no contribution to the recognition of stationary vehicles in such scenarios. Thus, one cannot distinguish reliably between a landmark of highway infrastructure and a vehicle.

Even a side distance of 2 m (greater than in the normal case) between the halted or stationary vehicles and the highway infrastructure at the road margin corresponds to an angle distance (azimuth) of only somewhat more than half a degree. This slight angle distance means that these halted vehicles are perceived as being a continuation of the highway infrastructure when individual detection points of the radar sensor are interconnected or combined into objects during the object recognition.

A similar scenario results in the case of stationary vehicles in a city environment on curves leading to a traffic signal installation (e.g., a traffic light).

A motor vehicle having a sensor circuit for surveying its environment is known, for example, from WO 2020/154366 A1. This specifies how stationary objects can be detected by way of at least one environmental sensor and charted in a digital environment map. Since, during such a measuring run of a motor vehicle, parking motor vehicles may also be detected as stationary objects and wrongly entered in the environment map, a comparison of the produced environment map with older versions of this environment map is also done later on in order to identify objects which only appeared during the current measuring run as temporary or transient objects and to remove them once more from the updated environment map if they were only seen during a single measuring run. It is not possible with this technology to recognize the far removed end of a traffic jam during a run of a motor vehicle.

It is also known from DE 10 2018 220 782 A1 that a motor vehicle can carry out a self-localization, that detection points of objects in the environment can be ascertained by way of at least one environmental sensor, and these detection points can be compared with map data in order to determine a relative position of the motor vehicle with respect to charted objects of the environment. However, this only works with objects which are close enough to provide a sufficient local resolution of the environmental sensor. Such a self-localization on the basis of map data and sensor data is also known from DE 10 2019 101 405 A1.

BRIEF SUMMARY

Embodiments of the disclosure provide techniques to distinguish, in a motor vehicle, other road users from stationary landmarks by way of at least one environmental sensor, even when the road users are not moving in the environment.

One aspect of the disclosure relates to a method for operating a sensor circuit in a motor vehicle, wherein a processor unit in the sensor circuit receives a reflection signal from an environment of the motor vehicle by way of at least one environmental sensor and ascertains from the respective reflection signal a particular detection point, which describes a relative position of a reflection event with respect to the motor vehicle. Thus, the method is based on the fact that an object in an environment of the motor vehicle reflects a signal, as is known, for example, electromagnetic radiation or ultrasound, and this reflection signal can be received by way of an environmental sensor. Examples of a reflection signal are a radar signal, an ultrasound signal, a LIDAR signal, and light. Radar, ultrasound, and LIDAR can each be emitted by the sensor circuit itself. Light, for example, can be received by way of a camera or a stereo camera. Before the shape of an object is recognized, only individual detection points of reflection events having taken place at a particular object are present in the sensor circuit, as is known. For example, such a detection point can indicate a distance and an azimuth angle (for example, relative to the vehicle longitudinal axis). A detection point can also indicate a height or Z-coordinate. Furthermore, in the case of a radar signal, a relative driving speed or speed of movement can be determined for the detection point.

In order to obtain an individual filtering function or a pointlike individual preprocessing for individual detection points, which already performs an estimation of whether a detection point might be another road user or a stationary landmark, it is proposed according to the disclosure that at least one surface region in the environment and a category of the respective surface region are established. Each surface region can serve as a template for the categorization of the individual detection points. The determination of the respective surface region and its category can be done by the processor unit by way of predetermined pattern data.

For the respective detection point, the processor unit verifies whether it lies in the at least one surface region, and the respective detection point which lies in a surface region is categorized according to the pattern data of this surface regions. For example, if a detection point lies, e.g., in a surface region of the "peripheral development" category, the detection point will be categorized as a reflection on a peripheral development. Detection points outside of each surface region can be categorized accordingly as the respective opposite or be left without a category or be assigned to a standard category.

The at least one detection point is then filtered according to its categorization by way of a filtering action for a trajectory planning of a driving trajectory of the motor vehicle. Thus, individually filtered detection points can be provided for the trajectory planning. The trajectory planning is that planning or calculation which establishes a driving trajectory along the upcoming driving route, i.e., a driving line and a speed profile to be adjusted along the driving line.

The disclosure affords the benefit, when determining individual detection points, to decide already on the basis of the pattern data for each of these individual detection points, in particular even when or already when it is not yet known to which object or object type the respective detection point pertains (stationary landmark or road users), whether the detection point is relevant to the trajectory planning or not, and a corresponding filtering or filtering action can be undertaken for the respective detection point. In this way, a connected processing unit will have less of a burden in terms of volume of data and/or computing workload and/or a wrong detection in the connected processing unit can be prevented.

Areas or shapes, for example, a horizontal surface region in the form of a rectangle and/or a triangle, can be defined as the surface regions of the environment, and for each detection point it can be determined whether or not it lies in a surface region. For each surface region the category to which it belongs can be indicated, for example, whether it is a surface of a stationary landmark or the surface of a roadway. Accordingly, a detection point can be assigned to that category of the surface region in which it is situated. In the event that a detection point lies outside one or each surface region of a particular category, it can be assigned to the opposite category or to a standard category or to no category. For example, if stationary landmarks are defined as the surface regions, the standard category of "potential road users" can be assigned to a detection point outside of each surface region of the stationary landmarks.

Thus, a preprocessing or filtering for the trajectory planning can be performed or provided already in dependence on the particular category of the detection point by way of the filtering action.

The trajectory planning which has been furnished with the filtered detection points can be the planning of a new driving trajectory and/or the monitoring and adapting of an existing driving trajectory. Thus, for example, upon recognizing at least one detection point belonging to a potential road user (a shape recognition has not yet been done at this time), the driving trajectory can be appropriately adjusted so that a collision avoidance is carried out or achieved (e.g., by decreasing the driving speed). The pattern data by way of which the surface regions are defined are the geometrical data or information describing the surfaces or boundary lines of the at least one surface region. It may be vector data or point data, to mention only some examples. The surface regions can be specified relative to the motor vehicle or in an absolute coordinates system of the environment or in a coordinates system of the particular environmental sensor.

The disclosure also encompasses embodiments which afford additional benefits.

A surface region can be used as an exclusion criterion, where the surface region is an area or a surface bounded off in the environment in which no road users can be present, because, for example, a building or in general an already known stationary landmark is already present in the surface region. Respective examples of a stationary landmark are a crash barrier, a building, a traffic sign, a traffic light or an infrastructure object in general, i.e., an object belonging to the traffic infrastructure and being installed there in stationary or permanent manner. A surface region which is occupied by such a stationary landmark can be used as said exclusion criterion in order to recognize or categorize a reflection event taking place there, that is, a detection point contained therein, as a detection of the stationary landmark. For a surface region which on the other hand corresponds to a roadway or which is covered by a roadway, a detection point or the corresponding reflection event means that a road user having caused the reflection event is detected or situated there.

For each surface region, it is possible to establish its category, i.e., stationary landmark or roadway, and thus to control or adjust the filtering action for detection points contained therein. For this, one embodiment proposes that the pattern data are determined from a digital environment map and describe stationary landmarks and/or roadways charted in the environment map and at least one surface region borders a surface occupied by a landmark and/or at least one surface region borders a surface occupied by a roadway. For the selection of the appropriate map data or the appropriate map segment, a receiver for a position signal of a GNSS (Global Navigation Satellite System) can be operated in the motor vehicle, for example, and the map data can be selected with the aid of the current geoposition from a navigation database.

One embodiment proposes that the respective surface region is defined as one of the following surfaces.

A surface region can be defined as a landmark surface comprising at least one stationary landmark and being irrelevant to driving thereupon, and not to be included in the trajectory. In addition or alternatively, a (different) surface region can be defined as a roadway surface or traffic surface for at least one other road user, being relevant to the trajectory planning. A roadway surface or traffic surface is a surface on which a motor vehicle or a vehicle in general can travel (i.e., also including a bicycle, for example) or more generally a source of potential traffic or other road users potentially situated there. In detection points are assigned to a landmark surface and/or a roadway surface, it can already be decided individually for the detection points without a shape recognition or an object recognition whether they involve a reflection event at a stationary landmark which has already been included in the trajectory planning with the aid of the map data of the environment map or whether they involve a potential road user which still needs to be factored into the further planning of the driving trajectory.

In order to make said map data congruent with the coordinates of the detection points, i.e., to describe them in the same coordinates system, one embodiment proposes that at least one further landmark is detected by way of the environmental sensor and/or by way of at least one further environmental sensor and described by further detection points and a relative position of the motor vehicle with respect to the at least one charted stationary landmark and/or the at least one charted roadway is ascertained by a comparison of the further detection points with the environment map and the environment map is thereby oriented or registered with respect to the motor vehicle. Thus, a position and/or a spatial orientation of the motor vehicle with respect to or "within" the environment map can be determined. The further detection points are, in particular, detection points in a nearby region or a midway region of the respective environmental sensor, in particular, they are closer than the first mentioned detection points, in particular closer than 100 m or closer than 75 m.

One embodiment proposes that a detection point which is recognized as being immovable in regard to the environment (i.e., calculated in absolute geo-coordinates) and which is situated outside of every surface region counted as a landmark surface and/or inside a surface region counted as a roadway region is categorized as a reflection event at a stationary road user. Because of the movement of the motor vehicle itself, a detection point at an object which is stationary in the environment can still be reported at first as a moving surface or a moving reflection event in the reflection signal itself, since the motor vehicle comprising the sensor circuit or the environmental sensor can itself be moving or traveling in the environment. But if it is recognized for the detection point, minus this movement of the motor vehicle itself, that it is stationary or immovable in relation to the environment, and if it is recognized in addition that it is situated outside of every surface region counted as a landmark surface, this detection point will be recognized or categorized as a reflection event at a stationary road user. Thus, it is also possible for a radar signal, for example, to distinguish a stationary road user from a stationary landmark, i.e., a building or a crash barrier, for example.

One embodiment proposes that the reflection event at a stationary road user is signaled as an end of a traffic jam or as a waiting line at a traffic sign (such as a stop sign) or a traffic signal installation (traffic light). Thus, it is possible already with the aid of a single detection point or a few detection points to detect the end of a traffic jam or the end of a waiting line, for example, at a stop sign or a red light, even when the road users have not yet been recognized by a subsequent object recognition because the detection points have not yet been investigated in this regard. Thus, it is possible to recognize the approach to an end of a traffic jam with a slim response time.

One embodiment proposes that the described filtering action involves the marking and/or deleting of a respective detection point of a landmark surface. If a detection point is recognized as lying within a landmark surface, it can be marked and thus will continue to be available to a connected processing unit. Alternatively, a detection point recognized as being a stationary landmark or belonging to a landmark surface can be deleted, which can reduce the computational workload in a connected processing unit, e.g., in the described object recognition.

The described surface regions in particular do not constitute the entire detection region of the environmental sensor, but instead they are partial surfaces or partial regions bounded off within the detection region, for example, by vector data and/or a contour line or boundary line. One embodiment proposes accordingly that the respective surface region is only a partial region (or segment) of an overall detection region of the respective environmental sensor. In particular, neither do these partial surfaces constitute a simple distance limitation, i.e., widely separated surface regions not relevant to the current planning of the driving trajectory (for example, all detection points at a distance of more than 200 m). Instead, it is proposed in particular that the pattern data define at least two surface regions situated next to each other along the driving trajectory, i.e., lying next to each other to the right and left, looking out from the vehicle. It is thus possible to distinguish between a surface region on a roadway margin and a surface region on the roadway itself. In other words, a lateral boundary exists between the surface regions. Hence, there are two surface regions lying next to each other from the perspective of the motor vehicle or the environmental sensor, i.e., one surface region situated further to the right and one further to the left. It is also possible to provide only at least one surface region for the roadway margin or one stationary landmark on the roadway margin and then a possible traffic region or roadway region will result outside of each surface region.

Thus far, we have described how surface regions can be defined by way of stationary landmarks from an environment map that can be used as landmark regions, i.e., describing stationary landmarks. Yet a positive detection (i.e., an active assigning of a detection point to a potential road user) can also be done without an environment map, with the aid of the upcoming roadway and/or the already planned driving trajectory. A surface region can be used for the active detection of another road user by defining as the surface region an area or a surface in the environment where a road user could potentially be present. If a reflection event then occurs, and hence a detection point in such a surface region, it can then be assumed that a road user is present there. In particular, such a surface region can be defined as a band or strip running along the driving trajectory and covering a tolerance range or margin region to the right and left of the driving trajectory. For example, the tolerance range can be defined along the driving trajectory with a width in the range of 2 meters to 20 meters. This surface region can be configured to be conically broadening, being wider as the distance is greater from the motor vehicle. Each detection point located in this traffic lane can then be evaluated or categorized as a reflection event at a potential road user. One embodiment proposes for this that, of the at least one surface region, at least one is defined by an upcoming roadway section (in the direction of travel of the motor vehicle) and/or by an upcoming traffic lane, which is formed by the driving trajectory and a tolerance range of given width situated on either side of the driving trajectory.

One embodiment proposes that the at least one environmental sensor comprises a radar sensor and the reflection signal describes, in addition to the relative position, also a speed of movement of the object causing the reflection event. The radar sensor affords the already mentioned advantage that a detection point can still be created or determined at a distance of more than 100 meters, especially more than 150 meters or more than 200 meters, and a speed of movement can also be associated with a detection point. In the event that this speed of movement is zero (with respect to the environment), the sensor circuit can support the evaluation of the reflection signal of the radar sensor by way of the method.

One embodiment proposes that the filtering action is used only for those detection points which are recognized as being stationary in the environment and/or which have a distance from the motor vehicle which is greater than a predetermined minimum distance. In particular, the filtering of the detection points is done for a minimum distance greater than 50 meters or greater than 100 meters or greater than 150 meters or greater than 200 meters. Thus, for stationary traffic objects at a distance greater than the minimum distance, the method can compensate for the resulting ambiguity of a detection point due to the close proximity or the small azimuth angle between traffic objects and stationary landmarks.

One embodiment proposes that after applying the filtering action a result of the filtering action is relayed to a connected processing unit and the processing unit carries out an object recognition with the aid of a relative position of the filtered detection points and/or the trajectory planning with the aid of a position of the detection points and/or a plausibility check for an object recognition and/or a trajectory planning. Such a processing unit can be, for example, an electronic control unit (ECU) or a group of several such ECUs. The object recognition (i.e., for example, the distinguishing between a traffic object and a stationary landmark or the recognition of an object type, such as "motor vehicle" or "passenger car" or "truck" or "pedestrian" or "bicyclist") can be supported in that the detection points are either marked by the filtering, i.e., they have a category such as stationary landmark, or the detection points of stationary landmarks are deleted. Detection points which can be assigned to a potential road user (especially without further object recognition) can be used during the trajectory planning, for example, for adapting the speed profile (speed reduction) and/or adapting the driving line (to drive around the object having caused the detection point). By way of a plausibility check, a second or further verification of an object recognition and/or a trajectory planning from another data source can be checked.

One embodiment proposes that a driver assist system performs the trajectory planning for an autonomous driving function (especially level 3 to 5) during the travel of the motor vehicle. In particular, a driver assist system for an automated or autonomous driving function can perform an evaluation of the reflection signals in more robust manner.

One aspect of the disclosure relates to a sensor circuit for a motor vehicle, comprising an environmental sensor for detecting of reflection signals from an environment of a motor vehicle. Such a sensor circuit can provide further information about the detection points by associating them with surface regions. For this, the environmental sensor is coupled to a processor unit which is adapted to carry out one embodiment of the method according to the disclosure.

The processor unit can comprise a data processing device or a processor circuit, which is adapted to carry out the embodiment of the method according to the disclosure. The processor unit can comprise for this at least a microprocessor and/or at least one microcontroller and/or at least one FPGA (Field Programmable Gate Array) and/or at least one DSP (Digital Signal Processor) and/or at least one ASIC (Application Specific Integrated Circuit). Furthermore, the processor unit can comprise a memory storing instructions or program code, which is adapted to carry out the embodiment of the method according to the disclosure when executed by the processor device. The program code can be saved in a data storage of the processor unit.

One embodiment proposes that the sensor circuit is configured as a radar. The radar can be supported by way of the method of detection of the end of a traffic jam and/or the end of a waiting line. By mapping or superimposing stationary landmarks from an environment map in the coordinates system of the detection region of the environmental sensor, especially the radar, it is possible to decide for a detection point whether it was caused by a stationary landmark or not. This can be accomplished for each individual detection point without associating it with a shape or without an object recognition.

One aspect of the disclosure relates to a motor vehicle. The motor vehicle according to the disclosure comprises at least one embodiment of a sensor circuit according to the disclosure. The motor vehicle according to the disclosure is preferably configured as an automobile, especially a car or truck, or as a personal bus or motorcycle.

The disclosure also encompasses the combinations of the features of the described embodiments. Thus, the disclosure also encompasses realizations having a combination of the features of several of the described embodiments, as long as the embodiments have not been described as being mutually exclusive.

BRIEF DESCRIPTION OF THE SEVERAL VIEWS OF THE DRAWINGS

In the following, exemplary embodiments of the disclosure shall be described.

DETAILED DESCRIPTION

In exemplary embodiments, the components described for the embodiments constitute each time individual, independently viewed features of the disclosure, which also modify the disclosure independently of each other. Therefore, the disclosure will encompass also other than the presented combinations of features of the embodiments. Furthermore, the described embodiments can also be supplemented by other of the already described features of the disclosure.

In the figures, the same reference numbers denote functionally identical elements each time.

Figure 1:
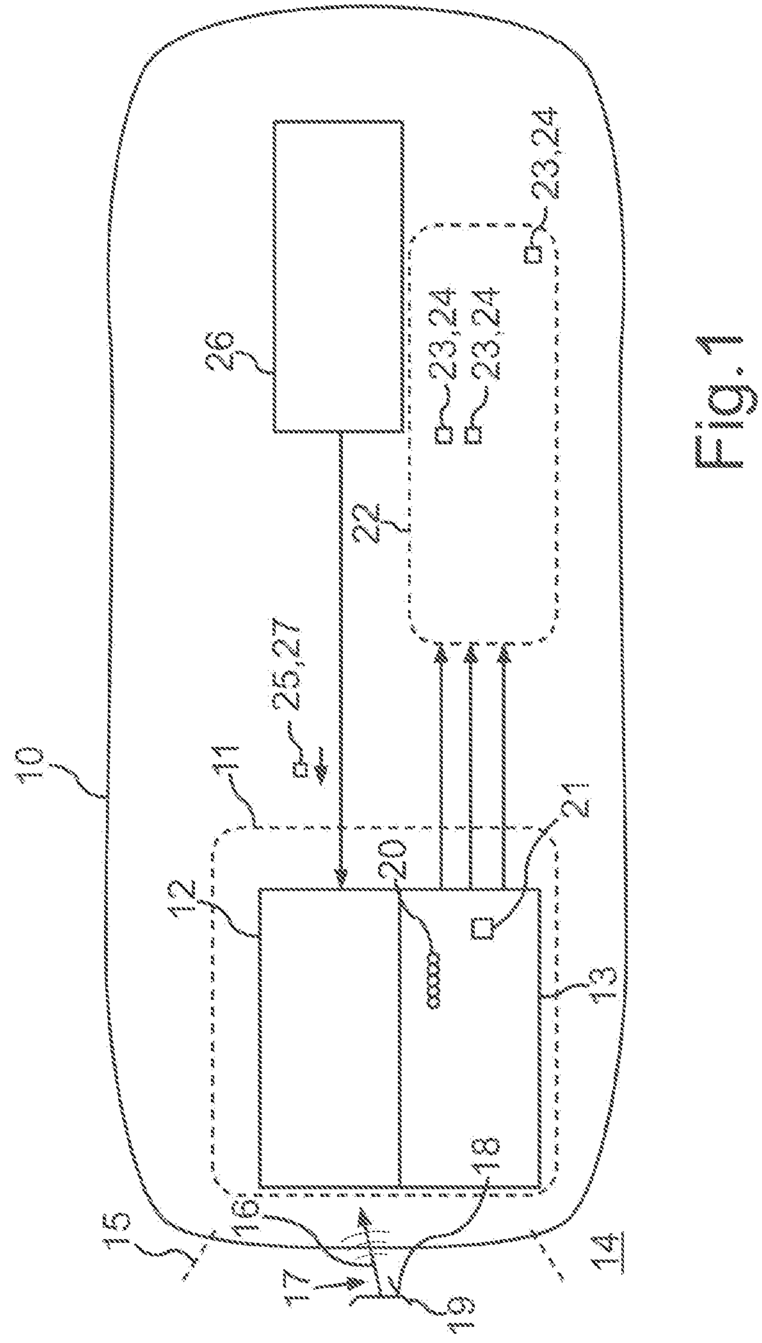
FIG. 1 shows a schematic representation of one embodiment of the motor vehicle according to the disclosure.

FIG. 1 shows a motor vehicle 10, which can be an automobile, especially a passenger car or truck. The motor vehicle 10 may comprise a sensor circuit 11, in which at least one environmental sensor 12 can be coupled to a processor unit 13. The sensor circuit 11 can be, for example, a radar sensor, especially a front radar, for which the environmental sensor 12 can be accordingly a radar sensor. By way of the environmental sensor 12, at least one reflection signal 16 can be received from an environment 14, especially from an environment situated in front of the motor vehicle 10, within a detection region 15 of the environmental sensor 12. The reflection signal 16 can be produced by a reflection event 17 at a reflection point or reflection surface 18 of an object 19 in the environment 14. For example, it may be a reflected radar signal of the environmental sensor 12 itself. The reflection signal 16 detected by way of the environmental sensor 12 can be processed in the sensor circuit 11 by the processor unit 13 such that the reflection signal 16 can be associated with a respective detection point 20, which describes a location or the coordinates of the respective reflection surface 18, without having to analyze or know the overall shape of the object 19 itself. Thus, each detection point 20 stands for a reflection event 17 in itself and it can indicate its coordinates in the environment 14, for example. These may be absolute coordinates in an absolute coordinates system of the environment 14 or relative coordinates in relation to the motor vehicle 10 and/or the sensor circuit 11. By way of a filtering action 21, the detection points 20 can be filtered and the result 22 of the filtering can then be that the detection points 20 are provided or put out as filtered detection points 23, where each filtered detection point 23 can be a categorized detection point 24, which can be associated with a category, such as one of the following categories: stationary object or stationary landmark, moving object or potential road user, temporarily stationary object or stationary road user.

For such a categorization, one can make use of map data 25 of a digital environment map 26, in which stationary landmarks can be charted or indicated. The map data 25 may represent pattern data 27, defining geographical patterns or surface regions in the environment 14 for which it is known that there is a stationary landmark located there.

Figure 2:
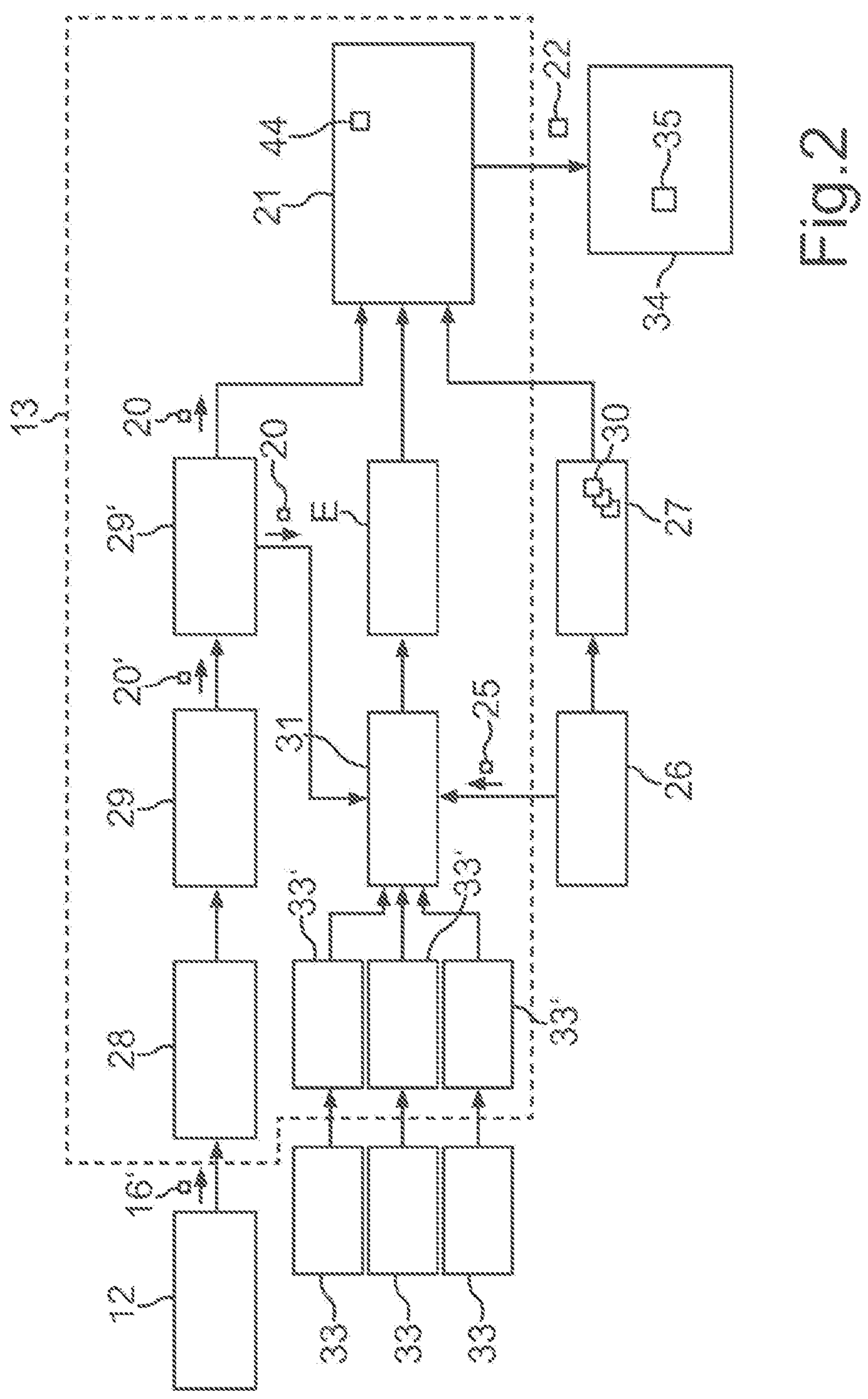
FIG. 2 shows a schematic representation of one embodiment of the sensor circuit according to the disclosure.

FIG. 2 illustrates one configuration of the sensor circuit 11. This shows how reflection signals 16' detected by the environmental sensor 12, such as echo signals or radar signals, can be analyzed or processed by way of a FFT (Fast Fourier Transformation) 28 and/or a CFAR (Constant False Alarm Rate) unit 29 and how potential detection points 20' can be provided by way of a detection of local maxima (peak detection).

By way of a clutter filter 29' for multipath propagation and/or clutter, perturbations such as those due to reflections during multipath propagation and/or perturbations due to weather conditions, such as fog or rain, can be suppressed, resulting in detection points 20 which can be subjected to the filtering action 21. The filtering action 21 here can be operated as a landmark detection filter, for example, in order to filter out or mark from signals the detection points 20 belonging to already known stationary landmarks.

For this, the described pattern data 27 describing the positions of landmarks 30 in map data 25 can be provided from the environment map 26, preferably a so-called HD map, likewise for the categorization.

In order to determine a relative position of these landmarks 30 in relation to the motor vehicle 10, the map data 25 can be provided additionally to a sensor fusion function 31, which can also receive the detection points 20 and/or sensor data 33' of at least one further environmental sensor 33. An example for a further environmental sensor may be a camera and/or a LIDAR and/or at least one further radar sensor. By comparing the sensor data 33' and/or the detection points 20 against the map data 25, the self-localization of the motor vehicle 10 and thus an ego position E in relation to the landmarks 30 can be determined.

On the basis of the ego position E of the motor vehicle 10 and the detection points 20, which can be indicated in relative coordinates in relation to the motor vehicle 10, landmarks 30 can now be defined or described as surface regions 44 (also see the other figures) in the environment 14 in the detection region 15.

By comparing the position of the detection points 20 with the surface regions 44, the detection points 20 can be categorized, and by way of the filtering action 21 the result 22 of the filtering can be generated and provided, for example, to at least one connected processing unit 34, such as a controller of the motor vehicle 10. A planning 35 of a driving trajectory of the motor vehicle 10 can be performed there, for example.

FIG. 3 to FIG. 6 illustrate the method described in FIG. 2.

Figure 3:
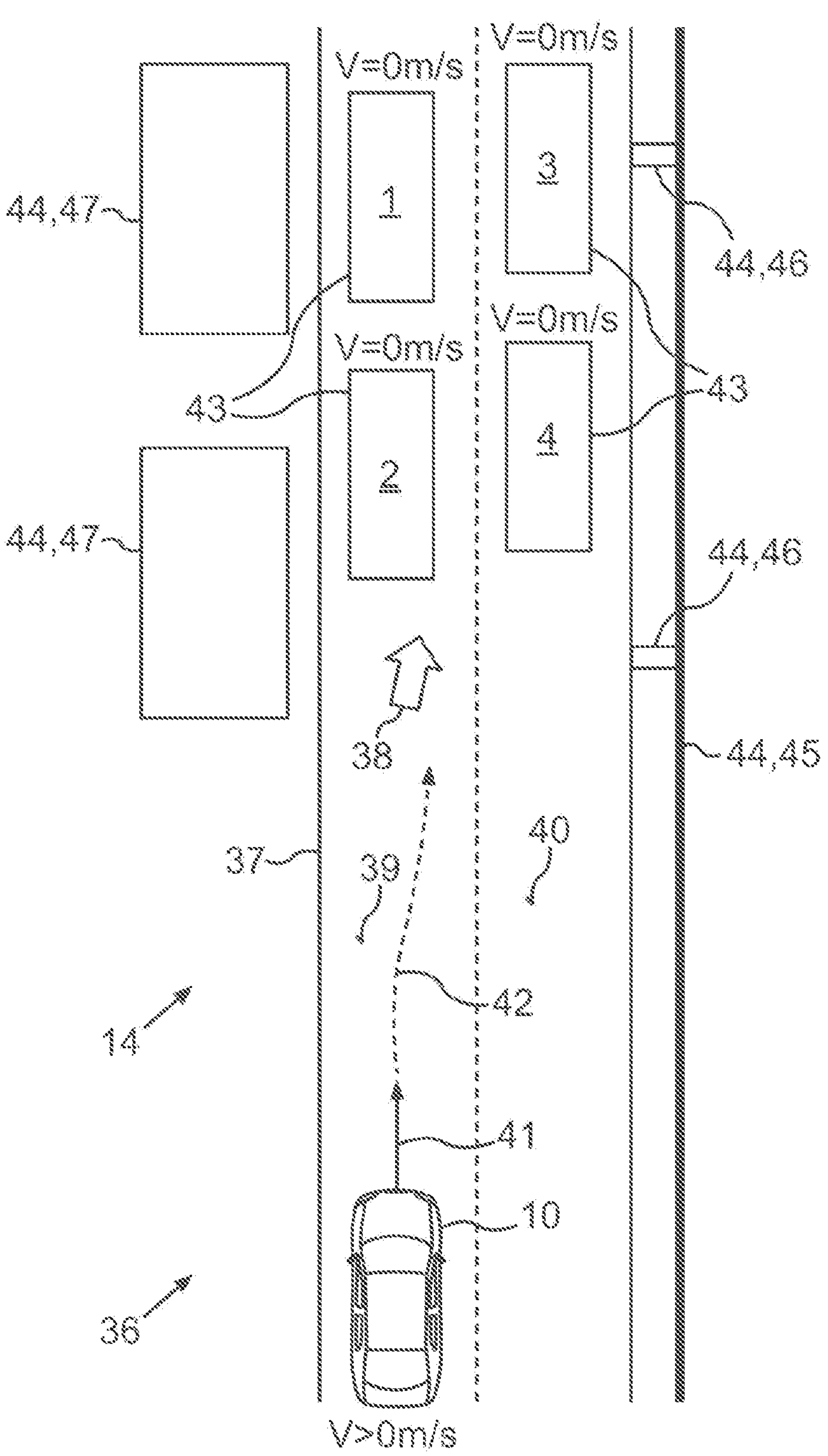
FIG. 3 shows a schematic representation of a top view of a traffic scene in which an embodiment of the method according to the disclosure can be carried out in the motor vehicle.

FIG. 3 shows for this a sample driving situation 36, in which the motor vehicle 10 in the environment 14 travels on a road 37 up to the end of a traffic jam 38. The motor vehicle 10 can travel on a driving lane which is therefore designated here as the ego driving lane 39. An adjacent driving lane 40 can likewise be blocked by the end of a traffic jam 38. In FIG. 3, a direction of travel 41 is indicated for the motor vehicle 10 along which the motor vehicle 10 can move with a speed V greater than 0 m/s. For example, the motor vehicle 10 may have planned a driving trajectory 42 by way of the processing unit 34, running along the ego driving lane 39. This driving trajectory 42 may not yet contain or have planned the end of a traffic jam 38, so that the driving trajectory 42 needs to be adjusted.

The end of a traffic jam 38 can be formed by vehicles 43 at a standstill, that is, their speed of travel V is equal to 0 m/s. In FIG. 3 there are furthermore shown other stationary landmarks 30, such as may be charted or described in the environment map 26. Examples of landmarks 30 here (FIG. 2) are represented by a crash barrier 45, crash barrier supports 46, and a building 47. Stationary landmarks can occupy a horizontal surface region 44 each time.

Figure 4:
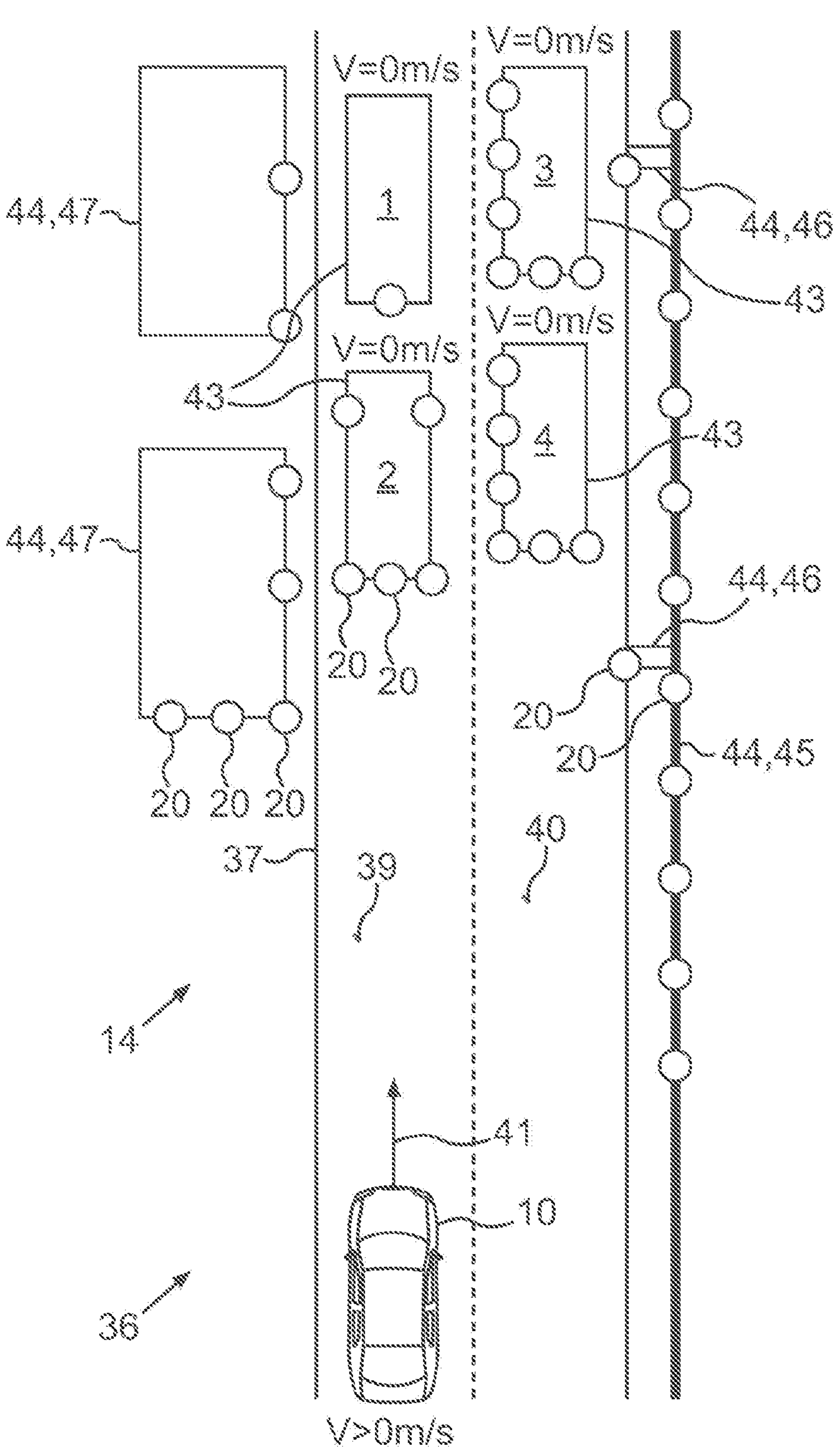
FIG. 4 shows a sketch to illustrate detection points ascertained from reflection signals from an environment of the motor vehicle.

FIG. 4 shows how each time a detection point 20 can be determined with the aid of the reflection signals 16. For sake of a clear drawing, only a few of the detection points 20 have been provided with a reference number in FIG. 4. It should be noted that at first only the detection points 20 are available for the method, that is, the contours or shapes of the stationary landmarks or the vehicles 43 are unknown or unrecognized.

Even so, by way of the sensor circuit 11 it is possible to analyze the individual detection points 20 without knowing their affiliation or to categorize whether they belong to a stationary landmark or a potential road user in the form of a vehicle.

Figure 5:
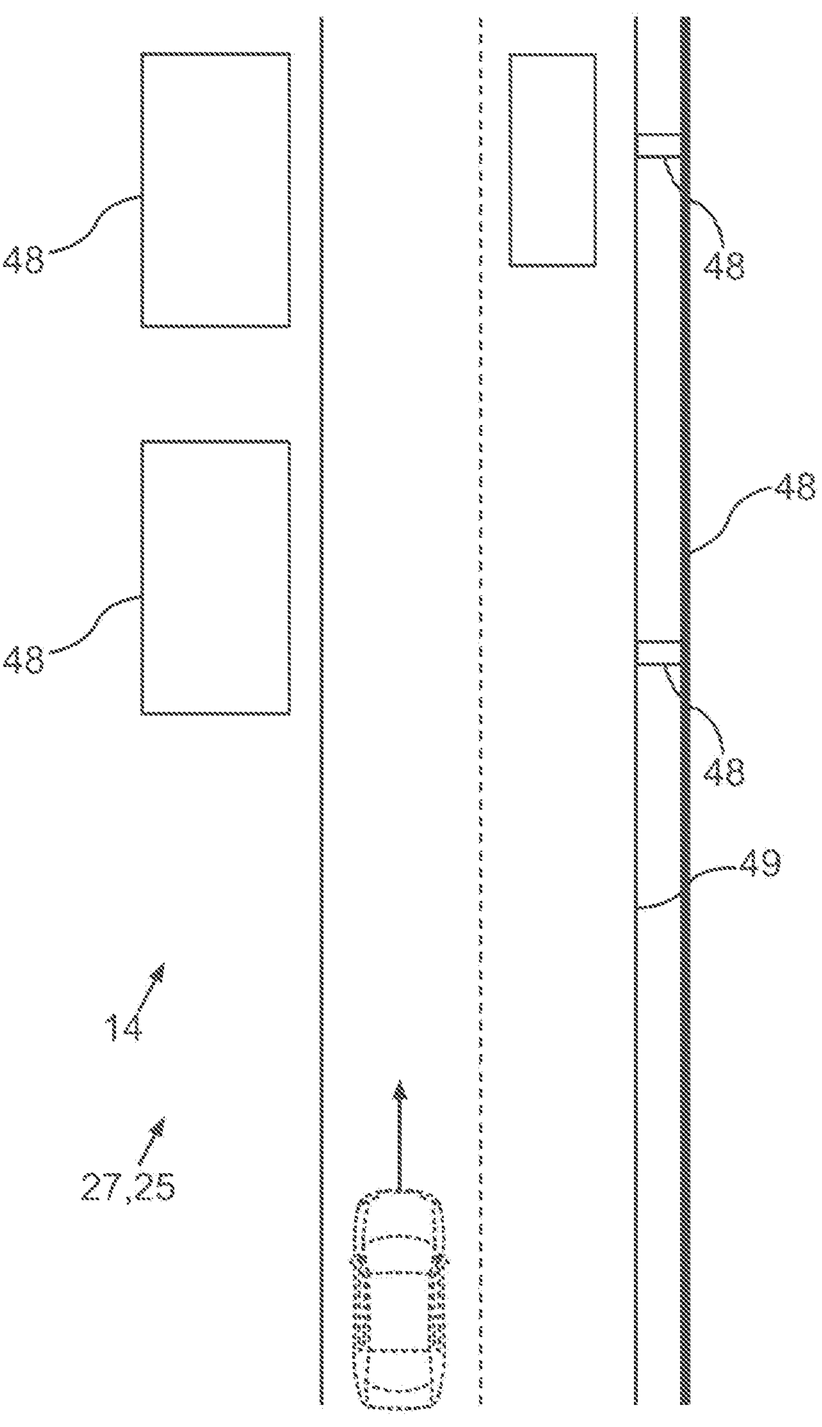
FIG. 5 shows a schematic representation to illustrate map data of a digital environment map.

FIG. 5 illustrates for this the pattern data 27 such as can be formed from the map data 25 of the environment map 26. It shows how charted surface regions 48 in the environment 14 for which it is known that a stationary landmark is situated within these charted surface regions 48 or that it describes their contour can be bounded off with the aid of the position of the stationary landmarks. In addition or alternatively, the road can also be bounded off or defined as a surface region 49 of a traffic surface or roadway surface and be described by pattern data 27. The charted surface regions 48 can be selected and used as surface regions 44 (see FIG. 4) for the categorization. For example, all those surface regions 48 can be selected which lie in a predetermined region in the direction of travel in front of the motor vehicle 10, especially that region for which the filtering will be done. The surface regions 44 may be larger than the charted surface regions 48, in order to allow for the fact that the reflection events can occur on the surface or on an outer margin of the particular stationary landmark.

Figure 6:
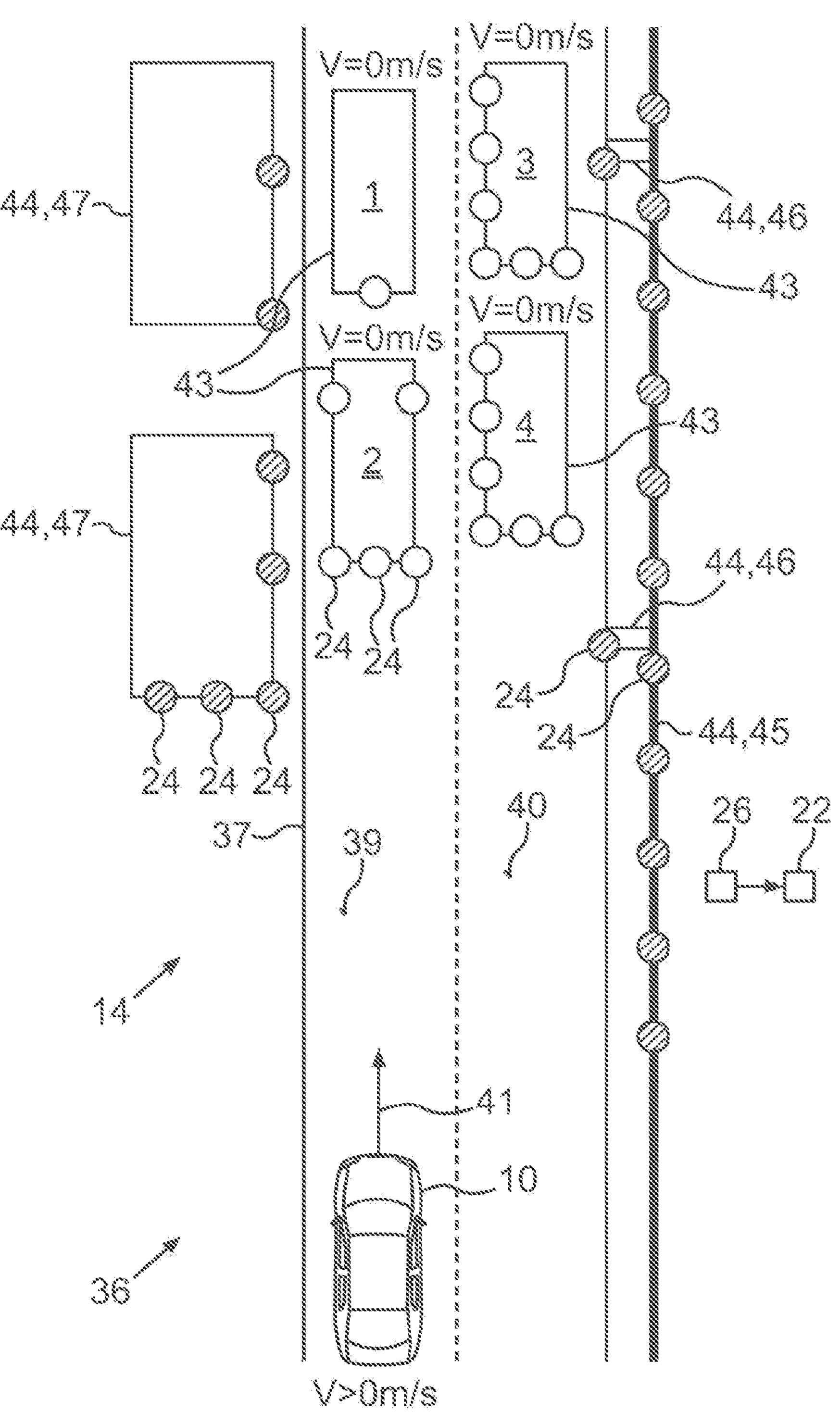
FIG. 6 shows a sketch to illustrate a filtering result of a filtering action.

FIG. 6 shows how, by comparing the coordinates of the detection points 20 with the categorized detection points 24 from the selected surface regions 44, an object can be determined or formed by categorizing a detection point 20 within a landmark surface, that is, a surface region 44 of a stationary landmark, as a detection point of a stationary landmark (shown with hatch marks). A detection point can then be regarded as lying within a surface region if its horizontal coordinates (such as X and Y or azimuth and distance from the motor vehicle) lie in the area bounded by the surface region 44 and/or on the boundary of the area, i.e., the height information or Z-coordinate can be ignored (since this is only available to radar in imprecise manner or not available at all). Alternatively, a height evaluation can be performed. Detection points outside these landmark surfaces can then be categorized as potential road users or detection points of potential road users (shown without hatch marks). By way of the filtering action 21, the categorized detection points 24 can then be processed or manipulated according to their category, for example, marked or deleted. This yields the result 22 of the filtering.

Thus, on the whole, a Radar Landmark Detection (RLD) filter is obtained.

Thus, a situation interpretation module of an autonomous or automated driving function of the motor vehicle 10 will not fail in recognizing the end of a traffic jam and it will trigger a signal to report an accident danger, for example. This logic or this method requires no human intervention by the driver (e.g., intensive braking) in an autonomous or automated driving mode.

The idea is to use landmarks (highway infrastructure and/or other stationary objects such as buildings along the road) from so-called HD map data (environment map with infrastructure information) to fuse them with the radar data of a radar sensor and/or to filter them out from the radar data. As a result, the detection system will be able to identify or detect the only temporarily stationary objects, such as vehicles standing still at the end of a traffic jam or at a signal light.

Thanks to the recognition of temporarily stationary objects, the driving function can make a decision and prevent a potential approach too close to a stationary vehicle standing still in front of it.

The inputs for the radar landmark detection filter can be the radar peaks after the filtering as well as the localization output (for the registering or positioning within the environment map) and the filtered landmarks from the environment map or HD map. The localization of the vehicle can be done after a fusion of all sensor data (insofar as is helpful to the localization) and additionally the map data. The localization can be helpful in matching up the axes of orientation of radar data and map data, so that the landmarks can be matched up with the radar detections with an accuracy deviation of less than one centimeter. A sample scenario (FIG. 3) can demonstrate the usefulness of the radar landmark detection filter, where the motor vehicle 10 as the ego vehicle approaches the end of a traffic jam/a red light; and landmarks are present in the field of view. The scenario contains the following vehicles at the end of a traffic jam: vehicles 1 and 2 on the ego lane and vehicles 3 and 4 on the neighboring lane. The scenario also contains buildings, crash barriers and traffic signs as orientation points (or highway infrastructure).

One example of a radar detection map is shown in FIG. 4, where it appears to be difficult to distinguish the temporarily static objects (target vehicles) from the landmarks/highway infrastructures, since the lateral distance between the stationary vehicles and the landmarks is very slight (much less than the angular distance which is possible today with a mass produced radar sensor).

The representation in FIG. 4 can be the (clutter) filtered result of the radar processing chain that is sent to the RLD filter. In addition, the RLD filter obtains the landmarks extracted from map data, as represented in FIG. 5, which can be combined with the radar data with the aid of localization information.

After the processing of the RLD filter, the radar detections pertaining to permanently stationary and/or non-traffic-relevant landmarks can be filtered out, so that only the detections of temporarily stationary objects will remain. These detections can then be sent to the situation interpretation block of a driving function or to further fusion with other sensor data and thus be helpful in the early recognition of the end of a traffic jam.

The landmark features are preferably extracted or filtered out from the HD map or environment map and fed to the radar processing system (in the radar device or in the central controller—depending on the ADAS (advanced driver-assistance system) architecture of the vehicle for the filtering technique known as Radar Landmark Detection or RLD filter (as mentioned in the proposed disclosure—see FIG. 1). The RLD filter extracts the radar reflections of infrastructure (or stationary objects) by comparing them against the HD map data, and thus distinguishes them from the radar reflections of temporarily stationary objects (such as stationary vehicles), resulting in a better recognition of temporarily stationary road users.

On the whole, the examples show how detection points of landmarks can be distinguished from detection points of stationary road users in sensor signals (especially radar signals) by a mapping of map landmarks onto the detection region of an environmental sensor (especially a radar).

German patent application no. 102021103134.6, filed Feb. 10, 2021, and international patent application no. PCT/EP2022/052076, filed Jan. 28, 2022, to which this application claims priority, are hereby incorporated herein by reference, in their entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a sensor circuit in a motor vehicle, the method comprising:

receiving, by a processor in the sensor circuit, a reflection signal from an environment of the motor vehicle by way of at least one environmental sensor;

determining, by the processor, based on the reflection signal, a particular detection point that describes a relative position of a reflection event with respect to the motor vehicle;

determining, by the processor, using pattern data, at least one surface region in the environment and a category of the at least one surface region;

determining, by the processor, whether the particular detection point lies in the at least one surface region, wherein at least one detection point that lies in the at least one surface region is categorized according to the pattern data of the at least one surface region;

filtering, by the processor, the particular detection point according to a categorization of the particular detection point, wherein the filtering is used only for detection points that are recognized as being stationary in the environment and having a distance from the motor vehicle which is greater than a predetermined minimum distance;

determining, by the processor, a driving trajectory of the motor vehicle based on the filtering; and providing, by the processor, the driving trajectory of the motor vehicle to an automated or autonomous driving function of a driver assist system that controls automated or autonomous driving of the motor vehicle.

2. The method according to claim 1, wherein the pattern data are determined from a digital environment map and describe at least one stationary landmark or at least one roadway charted in the environment map, and the at least one surface region borders a surface occupied by a charted stationary landmark or at least one surface region borders a surface occupied by a roadway.

3. The method according to claim 2, further comprising:

detecting, by way of the at least one environmental sensor, at least one further landmark described by further detection points; and determining a relative position of the motor vehicle with respect to the at least one stationary landmark or the at least one roadway by comparing the further detection points with the environment map and the environment map oriented with respect to the motor vehicle.

4. The method according to claim 1, wherein the at least one surface region is defined as one of:

a landmark surface having at least one stationary landmark and being irrelevant to travel upon the landmark surface, or a roadway surface for at least one other road user being relevant to the driving trajectory.

5. The method according to claim 4, wherein a detection point that is recognized as being immovable in regard to the environment and is situated outside of each of the at least one surface region counted as a landmark surface or is situated inside of one of the at least one surface region counted as a roadway region is categorized as a reflection event at a stationary road user, the reflection event at the stationary road user being signaled as an end of a traffic jam or as a waiting line at a traffic sign or a traffic signal installation.

6. The method according to claim 4, wherein the filtering involves marking or deleting a detection point of a landmark surface.

7. The method according to claim 1, wherein the at least one surface region is only a partial region of an overall detection region of the environmental sensor, or wherein the pattern data define at least two surface regions situated next to each other along the driving trajectory.

8. The method according to claim 1, wherein one of the at least one surface region is defined by an upcoming roadway section or by an upcoming traffic lane that is formed by the driving trajectory and a tolerance range of a given width situated on a side of the driving trajectory.

9. The method according to claim 1, wherein the environmental sensor comprises a radar sensor and the reflection signal describes, in addition to the relative position, a speed of movement of an object causing the reflection event.

10. The method according to claim 1, wherein, after the filtering, a result of the filtering is relayed to the processor, and the processor performs an object recognition based on a relative position of filtered detection points or the driving trajectory based on a position of each of the detection points or a plausibility check for the object recognition or the driving trajectory.

11. A sensor circuit for a motor vehicle that includes at least one environmental sensor that detects reflection signals from an environment of a motor vehicle, the sensor circuit comprising:

a processor; and a memory storing instruction that, when executed by the processor, cause the sensor circuit to:

receive a reflection signal from an environment of the motor vehicle by way of at least one environmental sensor, determine, based on the reflection signal, a particular detection point that describes a relative position of a reflection event with respect to the motor vehicle, determine, using pattern data, at least one surface region in the environment and a category of the at least one surface region;

determine whether the particular detection point lies in the at least one surface region, wherein at least one detection point that lies in the at least one surface region is categorized according to the pattern data of the at least one surface region, filter the particular detection point according a categorization of the particular detection point, wherein only detection points that are recognized as being stationary in the environment and that have a distance from the motor vehicle which is greater than a predetermined minimum distance are filtered, and determine a driving trajectory of the motor vehicle based on the particular detection point filtered according to the categorization of the particular detection point, provide the driving trajectory of the motor vehicle to an automated or autonomous driving function of a driver assist system that controls automated or autonomous driving of the motor vehicle.

12. The sensor circuit according to claim 11, wherein the sensor circuit is configured as radar.

13. A motor vehicle comprising at least one sensor circuit according to claim 11.

* * * * *